Aug. 28, 1951        J. S. MACKAY        2,566,223
PREPARATION OF MELAMINE
Filed Sept. 5, 1945
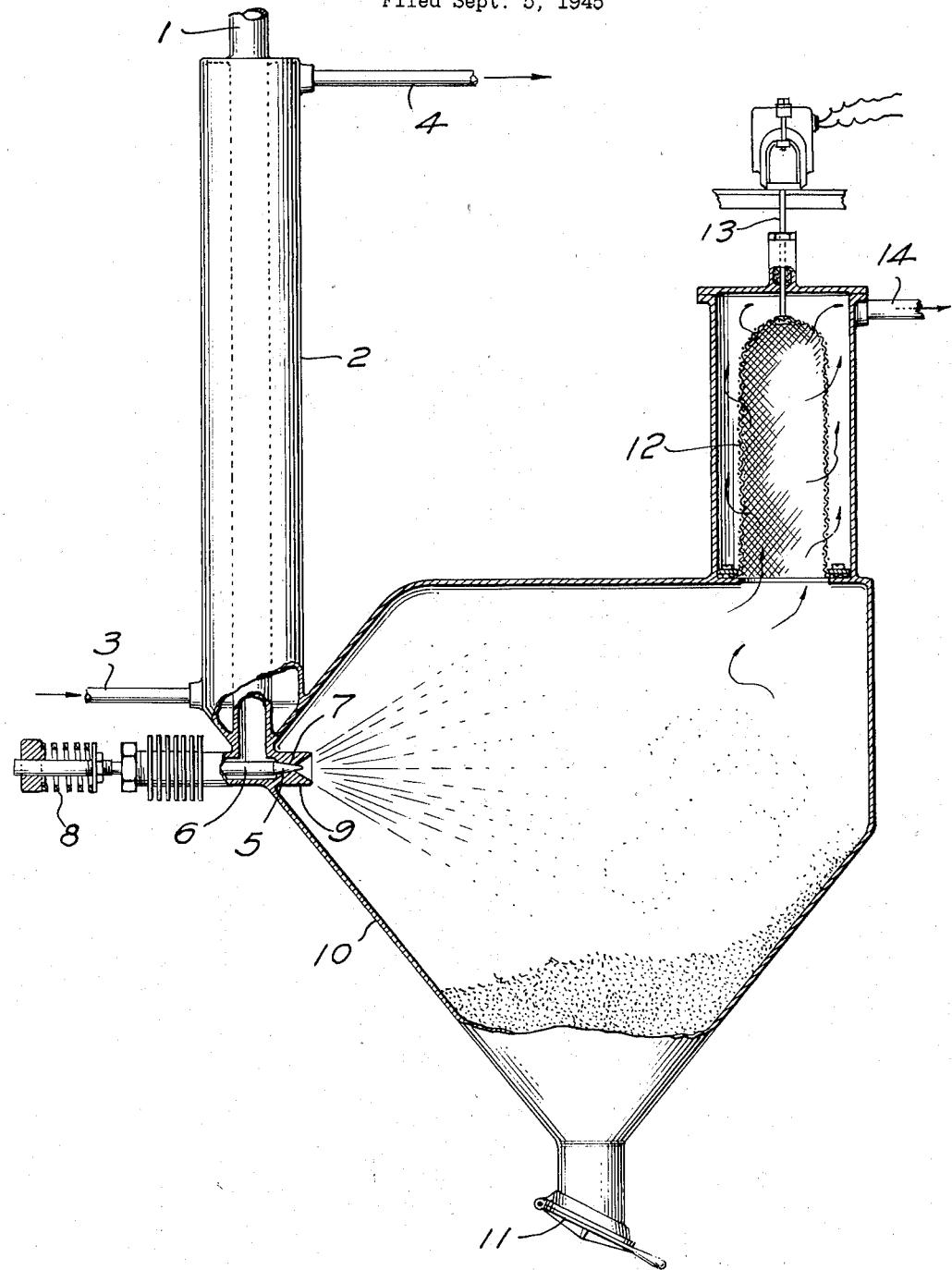
INVENTOR
JOHNSTONE S. MACKAY,
BY
Harvey W. Edelblute
ATTORNEY Patented Aug. 28, 1951

2,566,223

UNITED STATES PATENT OFFICE 2,566,223

PREPARATION OF MELAMINE

Johnstone S. Mackay, Old Greenwich, Conn., assignor to American Cyanamid Company, New York, N. Y., a corporation of Maine Application September 5, 1945, Serial No. 614,581

6 Claims. (Cl. 260—249.7)

This invention relates to an improvement in the art of preparing melamine.

In the United States patent to Fisch, 2,164,705, July 4, 1939, it is pointed out that in conventional processes of preparing melamine considerable difficulty is often caused by the building up of hard deposits of solid crystals of melamine when attempting to handle melamine in pipes and valves in the form of a liquid suspension of the crystals. Although melamine is known to decompose at temperatures near or above its melting point, about 350° C., it is proposed to produce melamine in a molten state and remove it from the reaction vessel through a valve above its melting point as a liquid. Decomposition of melamine is prevented by maintaining the molten melamine in an atmosphere of ammonia. Under these conditions, molten melamine can be handled without serious decomposition.

Although the process described and claimed by Fisch represents a notable advance in the art, I have found that the disadvantages overcome by that process can be overcome in a more efficient way by a distinctly different process without encountering certain difficulties arising in the operation of the Fisch process.

I have found that within carefully controlled conditions of temperature and pressure and by maintaining certain definite relative proportions of melamine to ammonia it is possible to convert substantially all of the melamine that is formed in the reaction vessel to vapor phase and the melamine can be removed in such form without difficulty in an exceptionally high degree of purity. Converting melamine to vapor phase and removing it in such form from a reaction vessel possesses a number of important advantages over the Fisch process in which melamine is removed as a liquid and possesses even greater advantages over those processes in which the melamine is removed in solid phase or in suspension in a liquid or dissolved in a solvent.

I have found, for example, that under the conditions of my process melamine vapor is more stable than molten melamine at comparably high temperatures. For some reason, there is less decomposition of the vaporous melamine to melam, melem, and other decomposition products of melamine, than there is when using conditions under which the melamine is produced and handled in a molten state. As a result, I can obtain a purer product, in higher yields than heretofore thought possible. A further advantage is that the pure product can be used directly in the manufacture of resins and other chemicals without intermediate purification steps.

An equally important advantage of my process over others for producing melamine in liquid form is the greater ease of its operation. Under my preferred conditions, nothing but vapor is discharged from the reaction vessel. Vapor issues from the discharge valve or nozzle in an even flow. There is less danger of plugging the outlet, as might occur when the outlet becomes cooled below the freezing point of molten melamine. There is less fluctuation of the pressure in the reaction vessel with its disturbing effects upon the smooth operation of the process. There is little chance of forming sizable drops of molten melamine which when discharged into the open atmosphere are still above 350° C. and tend to decompose with the formation of undesirable products. These hard drops of impure melamine must be separated from the pure melamine by screening, or otherwise, if a pure product is to be obtained. In my new process the discharged vapors are condensed as a fine powder which is then ready for use.

A further advantage of my invention is that it requires relatively low reaction pressures, particularly under the preferred conditions, which makes it possible to construct the apparatus with greater economy and operate it with less danger.

A still further advantage of the invention is that relatively small amounts of ammonia are employed, making the task of recovering this substance and recycling it in the process a simple and inexpensive one.

To describe the invention in greater particularity, reference is made to the accompanying drawing which is an elevation, with parts cut away and shown in section, showing suitable apparatus in which the process may be conducted.

The reaction vessel in which melamine is formed and converted into vapor phase comprises a tube 1 of stainless steel, or other corrosion resistant material which can withstand the temperature and pressure of the process. This tube is provided with heating means; for example, a jacket 2, into which a heated fluid may be introduced through line 3 and withdrawn through line 4.

In the operation of the process ammonia and a substance which forms melamine when heated is passed through tube 1 into the heated zone under conditions such that melamine is formed. A preferred melamine-forming substance is dicyandiamide because of the speed with which it is converted into melamine under the conditions of my process. Urea, a somewhat cheaper material, may be used instead of dicyandiamide. In such event, the heated zone of the tube should be somewhat longer inasmuch as the conversion of urea to melamine requires a longer period of time. Other melamine-forming substances which may be used in addition to dicyandiamide and urea include cyanamide, guanylurea, cyanourea, biuret, guanidine, cyanuric acid, ammelide, ammeline, melam, melem, melon, and still others. In fact, melamine itself may be introduced through the tube with ammonia to the heated reaction zone, where it is converted into vapor phase. As will be apparent from the nature of the invention, the essential feature of novelty is that melamine, which may be formed in the reaction zone by any process whatever, is converted into vapor phase and removed from the reaction vessel in such form.

The length and diameter of the reaction tube will naturally vary with the nature of the melamine-forming substance and the required capacity of the plant. When using melamine-forming substances such as dicyandiamide, which are almost instantly converted into melamine at the high temperatures of the process, the tube may be rather short, one successful conversion tube being only thirty inches long. The tube may be much longer, however, since melamine vapors are quite stable under the conditions of my process. When using urea, melam, and other substances which form melamine more slowly at the higher temperatures, the tube may be longer or the rate at which these materials are passed through may be slower. A few simple experiments will indicate the minimum tube length in each case without much trouble. Under preferred conditions most of the urea is converted to melamine in less than about five minutes.

As shown in the drawing, the reaction tube is vertically inclined. When using dicyandiamide or other melamine-forming substances which are rapidly converted to melamine at the temperatures of my process, I find that a vertically inclined tube is preferable, there being less danger of having the tube plugged with solid melamine which may be formed below 350° C. as the dicyandiamide is introduced into the heated zone. When using urea as the melamine-forming substance and other materials which form melamine more slowly and at higher temperatures, the reaction tube may be inclined horizontally or at an angle. If desired, the tube may be bent as in the case of a U tube.

Under the conditions of my process, which will be elaborated upon hereinafter, the melamine that is introduced into the heated zone of the tube, either by formation therein or otherwise, is almost instantly converted into vapor form. This vaporous melamine, ammonia, and other inert gas that may be accidentally or purposely introduced into the tube, is withdrawn from the heated reaction vessel through the orifice of a valve 5. The particular valve shown comprises a tapered valve stem 6 which fits into a tapered seat 7. Upon application of sufficient pressure in the reaction vessel the valve opens with sufficient clearance to allow the vapors to escape from the reaction vessel yet maintain therein the pressure necessary to keep the melamine in the reaction tube from decomposing. Operation of the valve at a desired pressure may be determined by an adjustable spring 8. Preferably, the discharge orifice 9 is tapered, as shown, although this is not necessary. As valves of this type are well known to those skilled in the art, further description appears to be unnecessary.

As will be obvious, other types of discharge valves, or throttling nozzles, may be employed to control the pressure in the reaction zone and simultaneously permit continuous discharge of melamine vapor therefrom.

The vapors from the discharge nozzle may be discharged into a cyclone separator or any suitable means of condensing the vapor and recovering melamine. One such device comprises a relatively large chamber 10 into which the vapors can discharge and the melamine condense as a finely divided solid. Preferably, the collector has a cone-shaped bottom so that the powdered melamine may be easily removed by gravity through gate 11, as shown.

The ammonia and other uncondensed vapors that may be present in the collector may be separated from the melamine by passing through a bag filter 12 which is of sufficiently fine mesh to retain the solid melamine, yet permit the uncondensed vapors to pass through. A vibrating device 13 is customarily used in connection with such bag filters to prevent clogging of the filter pores. The ammonia and other gases present are removed through line 14 and taken away for recovery and re-use or for any other purpose desired.

As previously stated, it is necessary to maintain conditions of temperature and pressure within the reaction chamber within certain critical limits if melamine is to be converted to vapor phase and maintained as such without decomposition and formation of undesirable by-products. I have found, for example, that at temperatures above 350° C. there should be a partial pressure of ammonia of at least 750 pounds per square inch. At lower partial pressures of ammonia, and particularly high temperatures, there is some decomposition of the melamine.

As will be apparent to those skilled in the art, certain inert gases such as carbon dioxide, nitrogen, etc., may be present in the reaction chamber. In fact, when using urea as the precursor of melamine, three mols of carbon dioxide are formed for each six mols of urea used in the process. The presence of such gases merely dilutes the other vapors but does not materially change the conditions necessary for successfully conducting the process. As noted above, however, there should be a total vapor pressure of ammonia of at least 750 pounds per square inch in the system to prevent decomposition of the melamine. The total pressure on the system which includes the minimum ammonia pressure and the pressure of the vaporized melamine, which is relatively low, may be increased with additional ammonia or other inert gas up to any practical limit.

The minimum operating temperature of the process depends considerably upon the total pressure on the reaction vessel and the relative proportion of melamine vapors to the other vapors in contact therewith. For example, when the total vapors in the system comprise about 5% of melamine vapor by weight, the minimum operating temperature is about 350° C. at a pressure of about 750 pounds per square inch. As the total pressure on the system increases, it is necessary to increase the minimum operating temperature if the melamine in the system is to be maintained substantially completely in vapor phase. At pressures of 2000 pounds per square inch the minimum operating temperature when the vapors contain about 5% melamine is approximately 380° C. At an operating pressure of 3000 pounds per square inch the minimum operating temperature is around 400° C. At an operating pressure of 5000 pounds per square inch the minimum operating temperature will be of the order of 450° C.

As the concentration of melamine vapor is increased, it is necessary to use higher minimum operating temperatures, the minimum also increasing with increased total pressure. When operating my process under conditions in which the vapors contain approximately 10% of melamine by weight, I prefer to use temperatures over 400° C. at 750 pounds per square inch, which minimum temperature gradually increases to 500° C. at 5000 pounds per square inch.

When using still higher concentrations of melamine in the system, the minimum temperature increases still more so that, when using conditions such that the concentration of the melamine vapors represents about 30% of the total by weight, the minimum operating temperature is about 500° C. at a total pressure of 750 pounds per square inch, the minimum temperature gradually increasing to about 600° C. at 2750 pounds per square inch.

I prefer to operate my process under such conditions that the vapors removed from the conversion vessel contain from about 10% to 30% by weight of melamine. It will be seen, therefore, that at my preferred condition, the minimum temperature of the vapors is 400° C. at 750 pounds per square inch and increases to 500° C. at 5000 pounds per square inch. It will be understood, of course, that lower or higher proportions of melamine can be used with corresponding changes in minimum operating temperatures. A practical lower limit, on the amount of melamine in the system appears to be about 2% by weight. Lower concentrations of melamine make it necessary to recycle large volumes of ammonia.

When using a very high proportion of melamine in the reaction system, for example, about 50% melamine vapor, the minimum operating temperature at 750 pounds per square inch is much higher, being about 550° C., and increasing to 600° C. at about 1500 pounds per square inch. At higher overall operating pressures, for example, at about 2750 pounds per square inch, the temperature at which the process is carried out must be very high, generally above 600° C.

As previously noted, one of the advantages of my process is that it can be carried out at relatively low pressures. Although pressures as high as 5000 pounds per square inch can be employed provided the concentration of melamine in the vapors is low and the temperature is high, I prefer to operate at pressures between 750 pounds per square inch and 2750 pounds per square inch at temperatures above 400° C. at the lower pressures and increases to about 500° C. at 2750 pounds per square inch. At these conditions the concentration of the melamine vapor is at least 10% by weight of the total vapors present.

In operating my process, a melamine-forming substance, such as dicyandiamide, is dissolved or suspended in a solution of liquid ammonia. This solution, which may be below the temperature required to convert the melamine-forming substance in the melamine, is then pumped at a pressure within the limits set forth herein into the heated reaction zone of the reaction vessel. Since the formation of dicyandiamide to melamine is a polymerization reaction, the amount of dicyandiamide will be between 2% and 50% by weight of the total weight of the liquor pumped into the reaction tube. When using urea, which requires 6 mols of urea to form 1 mol of melamine, 3 mols of carbon dioxide, and 6 mols of ammonia, the relative proportion of urea to ammonia is much greater.

As the melamine-forming substance enters the heated reaction zone it is almost immediately, particularly when using dicyandiamide, converted into melamine. When the conditions within the reaction vessel are as defined above, the melamine will immediately be converted into vapor phase before any substantial decomposition takes place. The substances in the reaction vessel in vapor form may then be discharged through a relief valve into a suitable collecting device at atmospheric pressure such as shown in the drawing.

As the vapors are adiabatically released into the collecting chamber at greatly reduced pressure, there is a cooling effect whereby the melamine is condensed at a temperature below its melting point. Because of the relatively low partial pressure of the melamine at atmospheric pressure the vapor is directly converted to solid without passing through the liquid state. This manner of converting melamine from vapor to solid state is one of the principal advantages of the present invention not heretofore mentioned. The result of the operation is that decomposition of the melamine, as it is passing through the liquid stage, is entirely avoided and the product is obtained as a fine powder which is ready for immediate use without intermediate grinding, screening, or purification steps.

What I claim is:

1. The improvement in the art of manufacturing melamine which comprises the steps of continuously passing ammonia and a substance which forms melamine through a reaction vessel under conditions such that melamine is formed and converted into vapor phase, such conditions comprising a partial pressure of ammonia vapor of at least 750 pounds per square inch, a total pressure of from about 750 pounds per square inch to 5000 pounds per square inch, a minimum temperature of at least 400° C. at 750 pounds per square inch and increasing to about 450° C. at 5000 pounds per square inch, the amount of melamine vapor being from about 2% to 50% by weight of the total vapor present, discharging said vapors into a receiver at atmospheric pressure whereby the vapors of melamine are cooled and condensed directly to solid phase melamine without passing through the liquid phase and thereafter recovering the condensed melamine in powdered form.

2. The improvement in the art of manufacturing melamine which comprises forming melamine in vapor phase in a reaction zone, the conditions comprising a partial pressure of ammonia vapor of at least 750 pounds per square inch, a total pressure of from about 750 pounds per square inch to 5000 pounds per square inch, a temperature between 400° C. and 600° C. at 750 pounds per square inch, the minimum temperature increasing to 450° C. at 5000 pounds per square inch, the amount of melamine vapor being from about 2% to 50% by weight of the total vapor present and discharging the vapors from said reaction zone to a zone of decreased temperature and pressure whereby the melamine is cooled to a temperature below its melting point and is condensed in solid form as a fine powder and thereafter recovering the said melamine.

3. The process which comprises converting melamine in a reaction vessel to vapor phase by maintaining conditions within the reaction vessel such that there is at all times a partial pressure of ammonia vapor of at least 750 pounds per square inch, the total pressure on the reaction vessel being from about 750 pounds per square inch to about 5000 pounds per square inch, the temperature being between 400° C. to 600° C. at 750 pounds per square inch to between 450° to 600° C. at 5000 pounds per square inch, the minimum temperature used increasing with increased pressure, the amount of melamine vapor being from about 2% to 50% by weight of the total vapors present, and discharging the melamine from said reaction vessel while in vapor phase to a zone of decreased temperature and pressure whereby the melamine is cooled to a temperature below its melting point and is condensed in solid form as a fine powder and thereafter recovering the said melamine.

4. The improvement in the art of manufacturing melamine which comprises heating ammonia and a substance which forms melamine in a reaction vessel under conditions such that melamine is formed and converted into vapor phase, said conditions comprising a partial pressure of ammonia vapor of at least 750 pounds per square inch, a total pressure of from about 750 pounds per square inch to 5000 pounds per square inch, a temperature between 400° and 600° C. at 750 pounds per square inch, the minimum temperature increasing to 500° C. at 5000 pounds per square inch, the amount of melamine vapor being from about 10% to 30% by weight of the total vapor present, and discharging the said melamine vapor from the reaction vessel to a zone of decreased temperature and pressure whereby the melamine is cooled to a temperature below its melting point and is condensed in solid form as a fine powder and thereafter recovering the said melamine.

5. The improvement in the art of manufacturing melamine which comprises the steps of introducing a solution comprising from about 2% to 50% by weight of dicyandiamide and liquid ammonia into a heated reaction vessel whereby melamine is formed and converted into vapor phase, conditions within the reaction vessel being such that the partial pressure of the ammonia vapor is at least 750 pounds per square inch, the total pressure in the reaction vessel is from about 750 pounds per square inch to 5000 pounds per square inch, the temperature is at least 400° C. at 750 pounds per square inch and increasing to about 450° C. at 5000 pounds per square inch, and discharging the formed melamine in vapor phase from the said reaction vessel to a zone of decreased temperature and pressure whereby the melamine is cooled to a temperature below its melting point and is condensed in solid form as a fine powder and thereafter recovering the said melamine.

6. The improvement in the art of manufacturing melamine which comprises the steps of heating in a reaction vessel ammonia and urea under conditions such that melamine is formed and converted into vapor phase, such conditions comprising a partial pressure of ammonia vapor of at least 750 pounds per square inch, a total pressure of from about 750 pounds per square inch to 5000 pounds per square inch, a minimum temperature of at least 400° C. at 750 pounds per square inch and increasing to about 450° C. at 5000 pounds per square inch, the amount of melamine vapor being from about 2% to 50% by weight of the total vapor present, and discharging the formed melamine in vapor phase from the said reaction vessel to a zone of decreased temperature and pressure whereby the melamine is cooled to a temperature below its melting point and is condensed in solid form as a fine powder and thereafter recovering the said melamine.

JOHNSTONE S. MACKAY.

REFERENCES CITED

The following references are of record in the file of this patent:

UNITED STATES PATENTS

| Number | Name | Date |
| --- | --- | --- |
| 2,164,705 | Fisch | July 4, 1939 |
| 2,233,817 | Korten | Mar. 4, 1941 |
| 2,288,964 | Widmer | July 7, 1942 |
| 2,396,193 | Paden | Mar. 5, 1946 |

FOREIGN PATENTS

| Number | Country | Date |
| --- | --- | --- |
| 502,148 | Great Britain | 1939 |
| 536,735 | Great Britain | May 26, 1941 |